US012730822B2

(12) United States Patent
Chen et al.

(10) Patent No.: US 12,730,822 B2
(45) Date of Patent: Sep. 8, 2026

(54) CLOUD DATA CONSOLIDATION AND PROCESSING SYSTEM

(71) Applicant: Salesforce, Inc., San Francisco, CA (US)

(72) Inventors: Paul Chen, Bellevue, WA (US); Hal Scott Hildebrand, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 394 days.

(21) Appl. No.: 17/541,844

(22) Filed: Dec. 3, 2021

(65) Prior Publication Data

US 2023/0177064 A1 Jun. 8, 2023

(51) Int. Cl.
*G06F 16/25* (2019.01)

(52) U.S. Cl.
CPC .................................. *G06F 16/254* (2019.01)

(58) Field of Classification Search
CPC ............................ G06F 16/254; G06F 16/215
See application file for complete search history.

(56) References Cited

U.S. PATENT DOCUMENTS 10,409,650 B2 9/2019 Zhao et al.
10,776,825 B2 9/2020 Zhao et al.
10,783,044 B2 9/2020 Zhao et al.
11,082,226 B2 8/2021 Hildebrand et al.
11,128,465 B2 9/2021 Hildebrand et al.
2015/0242520 A1* 8/2015 Li ....................... G06F 21/6218 707/770
2016/0132896 A1* 5/2016 Guerin ................ G06Q 30/018 705/317
2019/0348158 A1* 11/2019 Livesay ................ H04L 9/3239
2020/0097503 A1 3/2020 Zhao et al.

(Continued)

FOREIGN PATENT DOCUMENTS

CN 112437939 A 3/2021
EP 3824424 A1 5/2021
WO 2020018448 A1 1/2020

*Primary Examiner* — Charles D Adams
(74) *Attorney, Agent, or Firm* — Kwan & Olynick LLP

(57) ABSTRACT

Disclosed are some implementations of systems, apparatus, methods and computer program products for processing consent information. A data consolidation system obtains, from each of two or more computing systems, a corresponding set of data objects such that two or more sets of objects are obtained. Each data object is associated with a corresponding individual and includes consent information indicating whether the individual consents to an action in relation to corresponding contact information of the individual. Consent information is extracted, for at least one individual, from the sets of data objects such that two or more sets of consent information are collected, the sets of consent information including a first set of consent information corresponding to a first computing system and a second set of consent information corresponding to a second computing system. A set of consolidation rules configurable to consolidate the consent information for at least one individual is identified and applied to the sets of consent information such that a set of aggregated consent information is obtained. At least a portion of the set of aggregated consent information can then be provided to at least one computing system.

23 Claims, 9 Drawing Sheets

(56) References Cited

U.S. PATENT DOCUMENTS

| | | | |
|---|---|---|---|
| 2020/0097574 | A1 | 3/2020 | Hay et al. |
| 2020/0097680 | A1 | 3/2020 | Hay et al. |
| 2020/0364224 | A1 | 11/2020 | Hay et al. |
| 2022/0374411 | A1* | 11/2022 | Bailey ............... G06F 16/24532 |
| 2022/0382522 | A1* | 12/2022 | Heynemann Nascentes da Silva ......................... G06F 8/65 |
| 2023/0095756 | A1* | 3/2023 | Wilkinson .......... H04L 63/1416 726/6 |

* cited by examiner

CLOUD DATA CONSOLIDATION AND PROCESSING SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with managing inconsistencies within consent information associated with individuals across multiple organizational computing systems. More specifically, this patent document discloses techniques for consolidating consent information associated with individuals across multiple organizational computing systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed systems, apparatus, methods and computer program products for managing inconsistencies within consent information associated with individuals across organizational computing systems. These drawings in no way limit any changes in form and detail that may be made by one skilled in the art without departing from the spirit and scope of the disclosed implementations.

DETAILED DESCRIPTION

Figure 1:
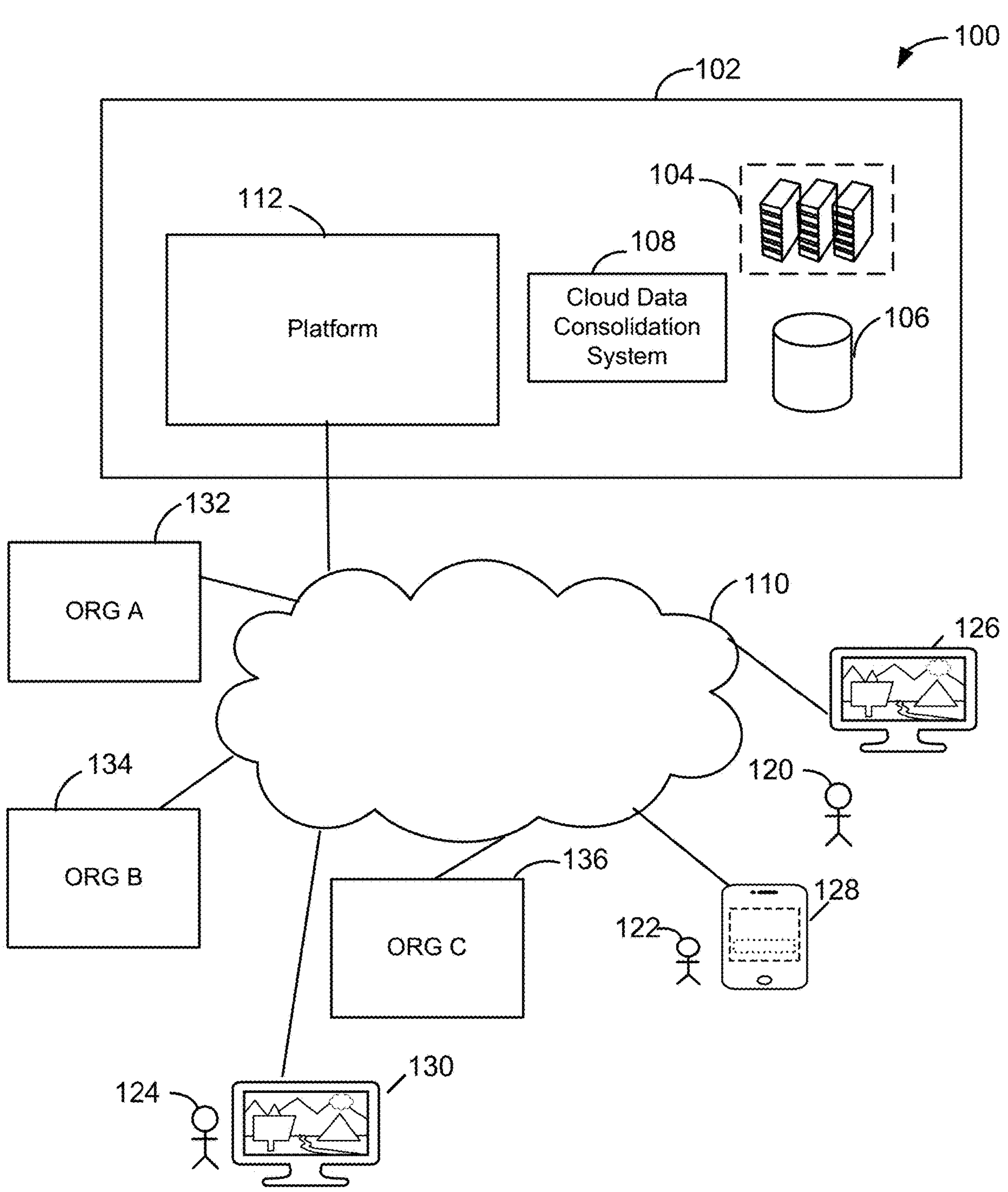
FIG. 1 shows a system diagram of an example of a system 100 in which a cloud data consolidation system is implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to facilitate the management of inconsistencies within consent information associated with individuals across multiple organizational computing systems. In some implementations, systems, apparatus, methods, and computer program products are configured to consolidate consent information associated with individuals across multiple organizational computing systems.

In many organizational database systems, information associated with individuals is maintained in data objects. A data object includes a set of attributes and associated values. More particularly, a data object can include, for attributes or fields of the data object, corresponding values. For example, a data object can be stored in the form of a database record. While it is possible for a single database record to represent an individual within an organizational database system, many systems commonly store information associated with "entities" such as customers, leads, and contacts. Each such entity will often be represented by a corresponding data object. Since an individual may be associated with multiple entities, information associated with a single individual will often be represented by multiple data objects.

A data object associated with an entity (e.g., entity record) typically includes information that identifies an individual, contact information associated with the individual, and notes that pertain to the entity. For example, a database record representing a data object can include a name, a phone number, and an electronic mail (email) address of an individual, as well as notes pertaining to the most recent telephone conversation with the individual.

An individual associated with an entity record can include a user of a website maintained by the organization. In many instances, the individual may be a consumer of goods or services provided by the organization.

An organization may wish to track "consent information" within an entity record. Consent information associated with an individual typically indicates whether the individual consents to a particular action in relation to corresponding contact information (e.g., a contact point). Contact information can include, but is not limited to, an electronic mail address, a phone number (e.g., mobile or home), and/or a mailing address. Example actions include emailing, calling, texting, faxing, and sending mail via postal mail.

Often, an individual may have different preferences for various actions and/or contact points. As a result, the consent information associated with an individual can include multiple consent preferences.

To maintain success of the organization, it is imperative that the organization comply with individual consent preferences. Specifically, prior to performing an action pertaining to an individual, the organization determines whether the individual has consented, either implicitly or explicitly, to the action. However, there are a number of factors that complicate the management of consent information.

First, since an individual may be associated with multiple entity records, the consent information within one record may conflict with that in another record. For example, an individual associated with a Lead database record may have indicated that they do not consent to receiving postal mail but have consented to receive emails at their work email address. The individual may also be associated with a Contact database record that indicates that they do not consent to receiving emails to their personal email address but consent to receiving postal mail.

Second, a business may have multiple organizations with which individuals may interact. In some instances, multiple organizations may be associated with various brands, divisions, and/or departments of the same company. For example, the business may have a parent company and one or more subsidiaries. In the event that consent information maintained by one organization conflicts with that maintained by another organization, resolution of such a conflict can be complex. This is further complicated by the fact that organizations may be located in different locales that have different legal requirements.

It is possible to manage consent information by incorporating consent policies within a data model that enables conflicts to be managed implicitly. By storing consent information within a data structure conforming to the data model, it is possible to respond to queries with accurate and truthful consent information. However, by enforcing consent policies within the data model, this makes it difficult to modify consent policies over time. Moreover, due to the redundant nature of the consent information, scalability of such a system is limited.

In accordance with various implementations, a set of data objects is obtained from each of two or more computing systems such that two or more sets of objects are obtained. Consent information is extracted, for at least one individual, from the sets of data objects such that two or more sets of consent information are collected. A set of consolidation rules configurable to consolidate the consent information, for at least one individual, across the computing systems is identified. The set of consolidation rules is applied to the sets of consent information such that a set of aggregated consent information is obtained. At least a portion of the set of aggregated consent information can be provided to at least one of the computing systems.

In some implementations, the sets of consent information are stored in a common format in data storage such as a data lake or data warehouse. Consent information stored in the data storage can be distributed among two or more servers that each applies the set of consolidation rules or portion thereof. In this manner, consent information can be consolidated and processed to ascertain accurate and truthful consent information in an efficient manner.

FIG. 1 shows a system diagram of an example of a system 100 in which a cloud data consolidation system may be implemented, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user profiles of users of system 102, as well as database records such as customer relationship management (CRM) records such as those described herein.

System 102 includes data consolidation system 108, which can implement one or more web applications. As will be described in further detail below, data consolidation system 108 can facilitate the consolidation and processing of consent information associated within individuals across organizational computing systems associated with two or more organizations. Each organizational computing system can include one or more servers. In this example, the organizational computing systems correspond to three organizations, ORG A 132, ORG B 134, and ORG C 136. However, this example is merely illustrative and consent information associated with any number of organizations may be consolidated and processed.

A trust relationship between data consolidation system 108 and the organizational computing systems may be established. Each organizational computing system may be associated with a tenant of a multi-tenant database system. A trust relationship may indicate, for a particular tenant, whether the tenant has access to specific data or services offered by data consolidation system 108.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and/or credentials of the user. Credentials of the user can include a username and password. The information can further include job related information such as a job title, role, group, department, organization, and/or experience level, as well as any associated permissions. Profile information such as job related information and any associated permissions can be applied by system 102 to manage access to web applications or services such as those described herein.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees. In other implementations, users 120, 122, 124 need not be employees of salesforce.com® or log into accounts to access services and data provided by system 102. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services or data provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively.

Client devices 126, 128, 130 can communicate with data consolidation system 108 directly or via platform 112. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

Communications between organizational computing systems 132, 134, 136 and data consolidation system 108 can be initiated by a user, data consolidation system 108, and/or organizational computing systems 132, 134, 136. Thus, communications between organizational computing systems 132, 134, 136 and data consolidation system 108 can be initiated automatically, in response to events detected by system 102 or organizational computing systems 132, 134, 136, or in response to a user request.

Some implementations may be described in the general context of computing system executable instructions, such as program modules, being executed by a computer. The disclosed implementations may further include computer-readable instructions, objects, data structures, and/or metadata, which may facilitate the consolidation and processing of consent information, as described herein.

Some implementations may also be practiced in distributed computing environments where tasks are performed by remote processing devices that are linked through a communications network. In a distributed computing environment, program modules may be located in local and/or remote computer storage media including memory storage devices.

As described above, an organization may store information associated with an entity such as a lead, customer, or contact in a corresponding data object. Since an individual may be associated with multiple entities, information associated with a single individual may be stored in multiple data objects.

Data objects can include objects of various types. In some implementations, a type of object may be associated with a corresponding class (e.g., lead, contact, customer, contact point consent, engagement channel type consent, communication subscription consent). An object may be generated by instantiating a class.

Figure 2:
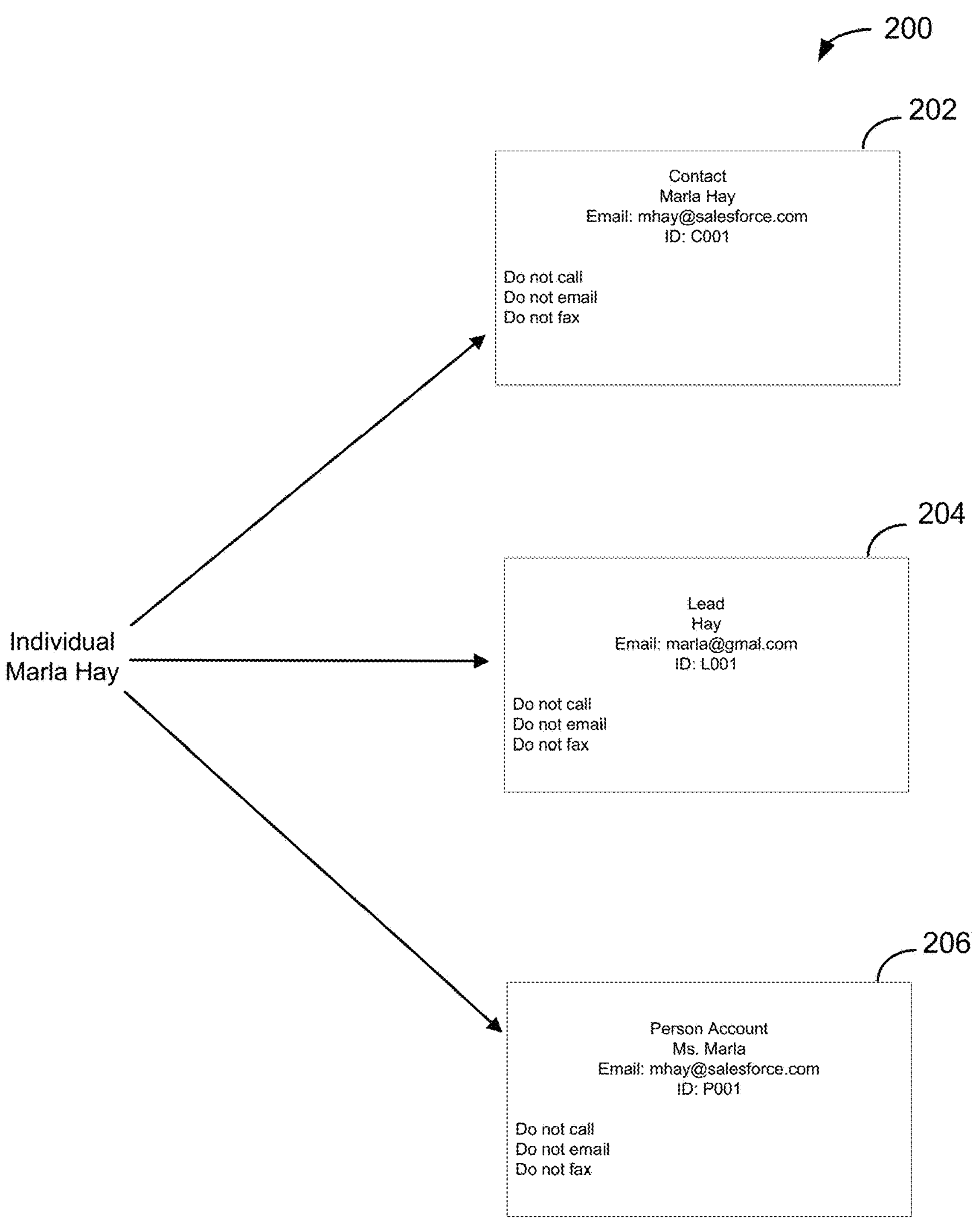
FIG. 2 shows a diagram of an example of data objects associated with an individual, in accordance with some implementations.

Data objects can include objects of various categories. For example, a data object may represent organizational data such as customer or lead data. As another example, a data object may represent personal data such as user profile data FIG. 2 shows a diagram of an example of data objects 200 associated with an individual, in accordance with some implementations. In this example, an individual, Marla Hay, is associated with data objects 202, 204, 206, where each data object is associated with a corresponding entity. More particularly, data object 202 corresponds to a contact entity, data object 204 corresponds to a lead entity, and data object 206 corresponds to a person account or user profile entity. Each data object may correspond to one or more database records.

As shown in FIG. 2, a data object or associated database record can include consent information that indicates whether the individual consents to a particular action. For example, data object 202 indicates that the individual does not consent to receiving phone calls, emails, or faxes from the organization. In some implementations, the consent information indicates the individual's preference with respect to a particular action in association with a specific contact point. In some instances, the data object may indicate a particular time period during which the consent information is valid. A database record may store consent information associated with an individual in one or more fields of the database record.

Figure 3A:
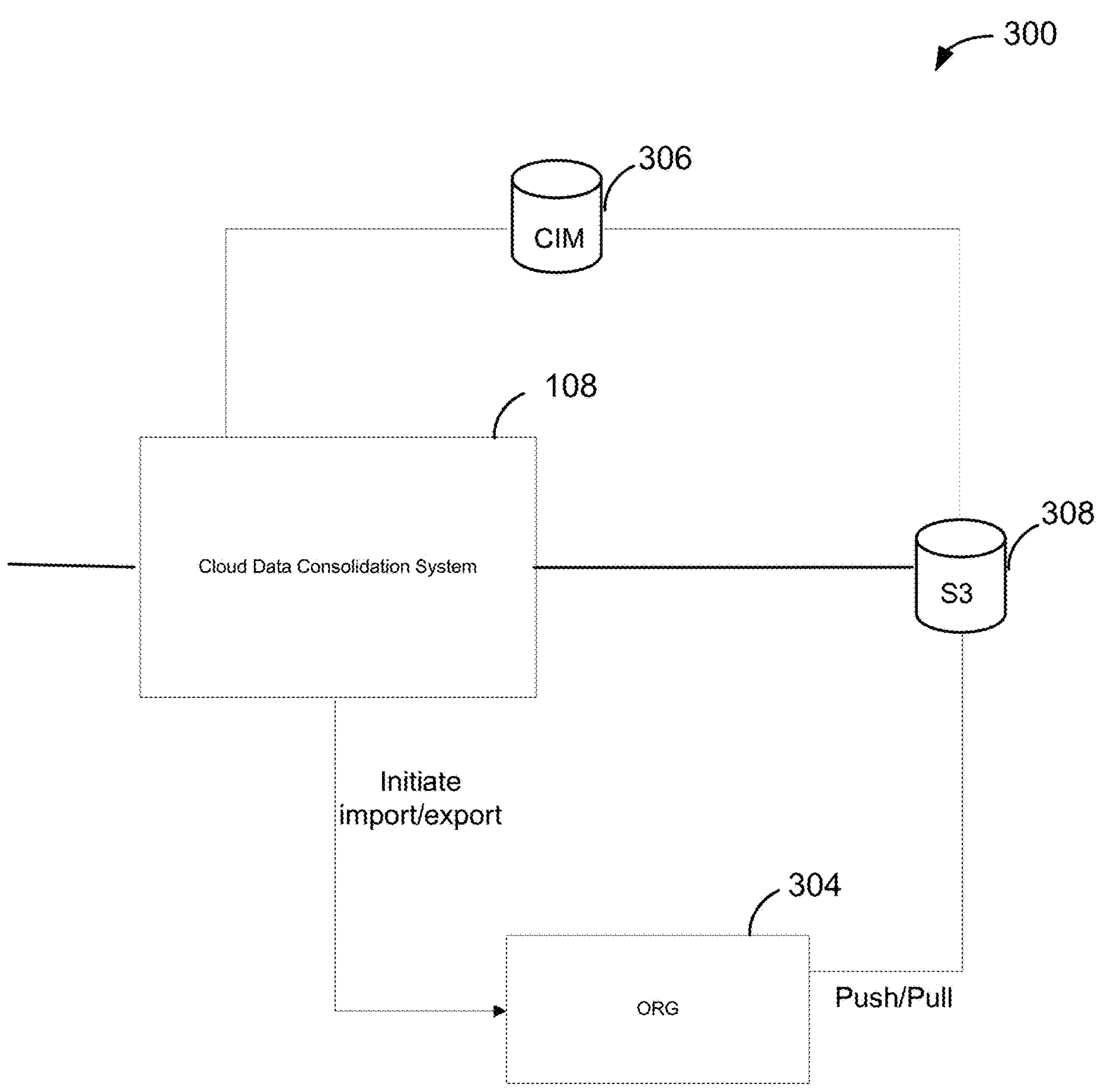
FIG. 3A shows a diagram illustrating an example of a consolidated data flow facilitated by a data consolidation system, in accordance with some implementations.

FIG. 3A shows a diagram illustrating an example of a consolidated data flow 300 facilitated by a data consolidation system 108, in accordance with some implementations. Data consolidation system 108 can operate as a hub or proxy service via which an organization (e.g., organizational computing system) 304 can provide or access information including consent information. In some implementations, data consolidation system 108 can transmit a communication to organization 304 to initiate the import of data including consent information from organization 304. Similarly, data consolidation system 108 can transmit a communication to organization 304 to initiate the export of data including consent information to organization 304. Such a communication can be initiated automatically (e.g., periodically), in response to an event detected by consolidation system 108, or in response to a command received from a user via a graphical user interface (GUI) provided by data consolidation system 108.

In some implementations, data that is imported from organization 304 or exported to organization 304 can include one or more data objects. Such data objects can include all data objects pertaining to a particular individual or set of individuals. For example, an import or export can include a stream of data that is transmitted via a network.

In other implementations, data that is imported or exported includes a "delta" between data previously imported from organization or exported to organization 304, respectively. For example, the delta can consist of data objects containing consent information that has been modified or updated since a prior import or export. As another example, the delta can consist of values corresponding to fields for which modifications have occurred since a prior import or export. Data that is imported from organization 304 can be stored in data storage 306 in a common format, which may be defined by a Common Information Model (CIM). Data storage 306 can include a "data lake" or data warehouse. More particularly, data received from organization 304 may be converted to the common format using translation metadata prior to being stored to data storage 306. For example, translation metadata may indicate a mapping between fields of objects of organization 308 and fields of the common format or CIM.

Data stored in data storage 306 may be maintained such that each organization is associated with a corresponding set of data. For example, consent information may be stored in association with a tenant identifier. By maintaining a tenant identifier in association with the corresponding set of data, it is possible to subsequently apply consolidation rules that manage inconsistencies between consent information maintained by different organizations.

In some implementations, data that is exported to organization 304 or imported from organization 304 can be stored in a temporary "bucket" 308 (e.g., storage buffers). In some implementations, organization 304 may access bucket 308 directly.

In FIG. 3A, data consolidation system 108 is described with reference to a single organization 304 to simplify the illustration. However, it is important to note that exporting and importing of data may be performed for any number of organizations.

In some implementations, data consolidation system 108 extracts consent information from data stored in data storage 306, applies a set of consolidation rules (e.g., policy metadata) configurable to consolidate consent information to the extracted consent information to generate aggregated consent information, and provides at least a portion of the aggregated consent information to organization 304. In other words, data consolidation system 108 can filter the aggregated consent information to provide a subset of the aggregated consent information to organization 304.

Data consolidation system 108 can transmit (e.g., push) aggregated consent information to organization 304 by data consolidation system 108. Alternatively, organization 304 can access aggregated consent information by querying data stored in data storage 306 via an application programming interface (API). Data that is exported to or queried by organization 304 can be written back into pre-existing or newly generated data objects maintained in a database of organization 304, thereby minimizing inconsistencies and ensuring truthfulness of consent information accessed internally via organization 304.

In the above-described example, data import, data consolidation, and/or data export can be initiated by data consolidation system 108. However, it is important to note that this example is merely illustrative. Therefore, data consolidation, import of data from organization 304, or export of data to organization 304 may be initiated by organization 304 or data consolidation system 108, as will be described in further detail below with reference to FIG. 3B.

Figure 3B:
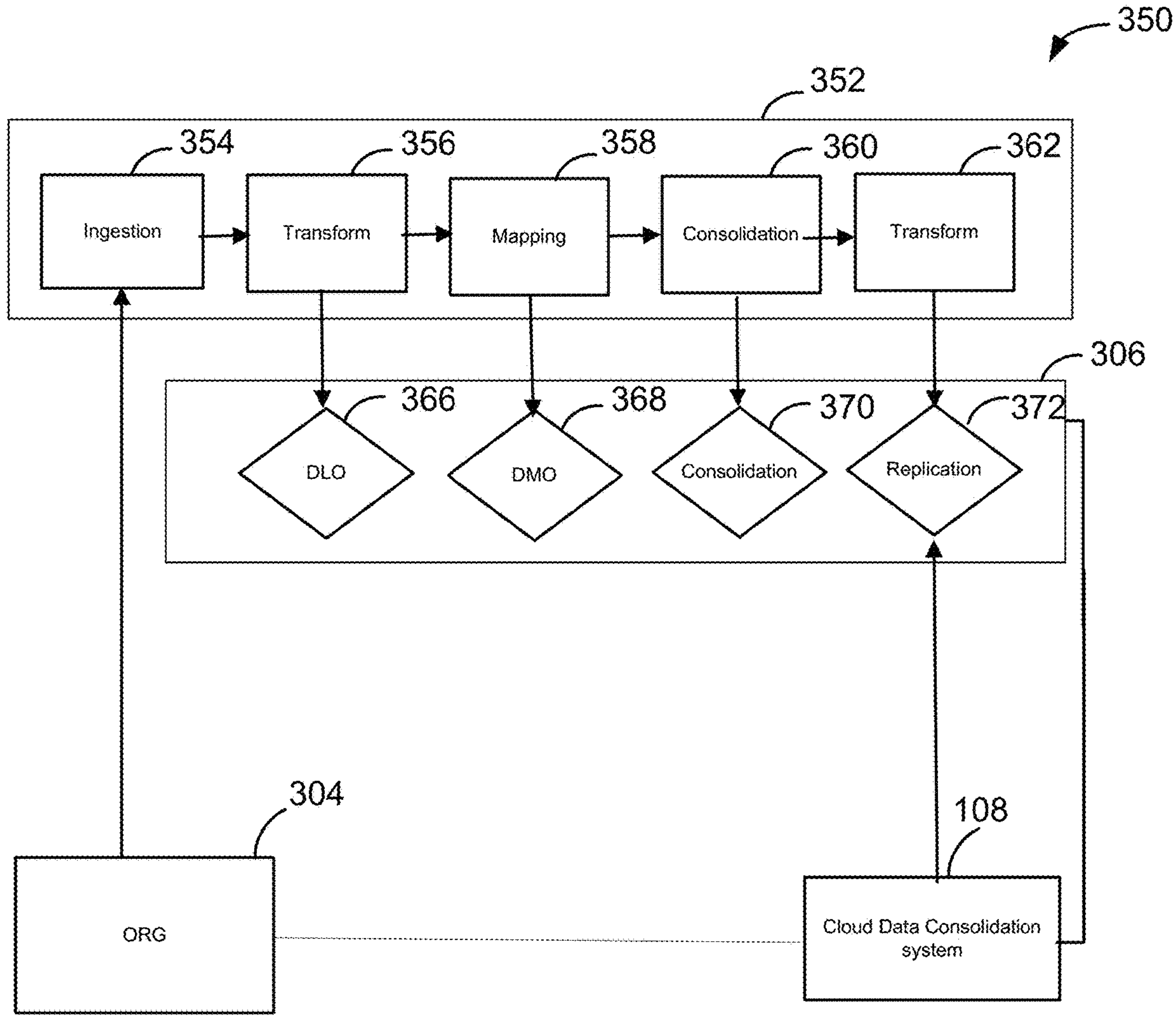
FIG. 3B shows a diagram illustrating another example of a consolidated data flow, in accordance with some implementations.

FIG. 3B shows a diagram illustrating another example of a consolidated data flow 350, in accordance with some implementations. In some implementations, an analytics engine such as Apache Spark™ is configured to implement one or more data consolidation processes, represented by data pipeline 352. The analytics engine can perform bulk data processing using Hadoop via a MapReduce process.

As described above with reference to FIG. 3A, the data consolidation process can be initiated by data consolidation system 108. In other implementations, the import of data from organization 304 can be initiated by organization 304. More particularly, organization 304 can transmit the data directly to pipeline 352 or, alternatively, can transmit the data to data consolidation system 108 for filtering prior to processing by pipeline 352. For example, the import of data from organization 304 can be initiated automatically (e.g., periodically). As another example, an event initiated by a user of organization 304 or detected by a computer-implemented process of organization 304 can initiate the import of data. Importing of data can be facilitated, for example, via an API of system 102 (or pipeline 352). Therefore, data consolidation can also be initiated automatically by organization 304 or in response to an event detected by consolidation system 108, where the event is initiated by a user or a system process of organization 304.

Various events may trigger the import of data from organization 304 or the consolidation of that data by pipeline 352. Such events include, but are not limited to, a change in data stored by organization 304, a change in consolidation rules implemented by organization 304, or change in preferences of organization 304. A change in data can include deletion, addition, or modification of data. For example, a change in data can include a new version of data. A change in preferences can include, for example, a change in consent preference of an individual user of organization 304.

In this example, data pipeline 352 performs ingestion 354 of data received or otherwise obtained from organization 304 and transforms 356 the data such that the data is stored in data storage 306 in its original format, represented by Data Landing Object (DLO) 366. A described herein, the data that is ingested can include data objects having consent information or a subset of the information within the data objects. For example, the data can include all data objects having consent information or, alternatively, can include a delta consisting of data (e.g., data objects or a subset of fields of the data objects) that has been modified since a previous data consolidation process. The data may be associated with metadata that indicates a version of the data, enabling data pipeline 352 to process a delta between two different versions that are stored in data storage 306.

Data objects maintained by organization 304 may conform to a corresponding tenant data model. Pipeline 352 translates the data from the tenant data model to the CIM using a mapping at 358 upon storing data objects to data storage 306, as represented by Data Model Object (DMO) 368. While a single organization 304 is shown in this example, it is important to note that pipeline 352 can store and process tenant data for any number of organizations.

Pipeline 352 consolidates the translated tenant data DMO 368 (e.g., associated with two or more organizations) at 360 using a set of consolidation rules and stores the resulting consolidated data 370 to data storage 306.

Pipeline 352 can transform the consolidated data at 362 by retrieving or replicating at least a portion of the consolidated data, as shown at 372. The replicated data 372 can be translated from the CIM to the tenant data model upon exporting data to organization 304.

In some implementations, translation between the CIM and the tenant data model may be performed by pipeline 352 or data consolidation system 108. In other implementations, translation between the CIM and the tenant data model may be performed by organization 304.

In this example, the exporting of replicated data to organization 304 is initiated by data consolidation system 108. For example, data export can be initiated via an API of system 102 (or pipeline 352). Data consolidation system 108 can retrieve the replicated data and filter the data prior to providing the filtered data to organization 304. Filtering may be useful, for example, to identify delta information representing consent change events (e.g., e.g., object type="Contact Point Consent," field="Status", "field value=opt out.") Thus, the exported data can include values corresponding to one or more fields of an object maintained by organization 304. In other implementations, the export of data to organization can be initiated by organization 304. More particularly, organization 304 can initiate data export automatically (e.g., periodically). Alternatively, organization 304 can initiate data export in response to an event initiated by a user of organization 304 or detected by a computer-implemented process of organization 304. Exporting of data can be initiated by organization 304, for example, via an API of system 102 (or pipeline 352). Therefore, the export of data can also be initiated automatically by organization 304 or in response to an event detected by organization 304.

Figure 4:
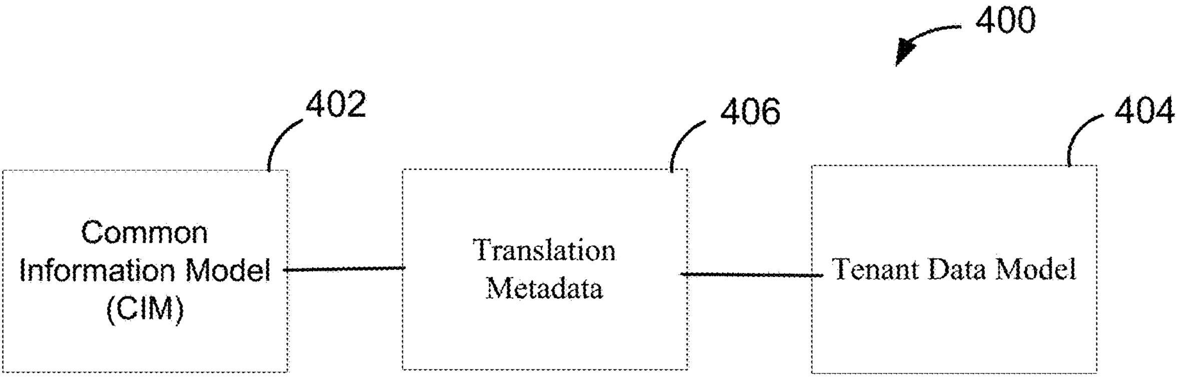
FIG. 4 shows an example conversion between a common information model (CIM) and a tenant data model, in accordance with various implementations.

FIG. 4 shows an example conversion between a common information model (CIM) and a tenant model, in accordance with various implementations. Translation between Common Information Model (CIM) 402 and Tenant Data Model 404 may be facilitated using translation metadata 406 stored by data consolidation system 108 or organization 304. Translation metadata 406 may include a mapping between fields of Tenant Data Model 404 and fields of CIM 402. Translation metadata 406 may be maintained for each organization.

Figure 5:
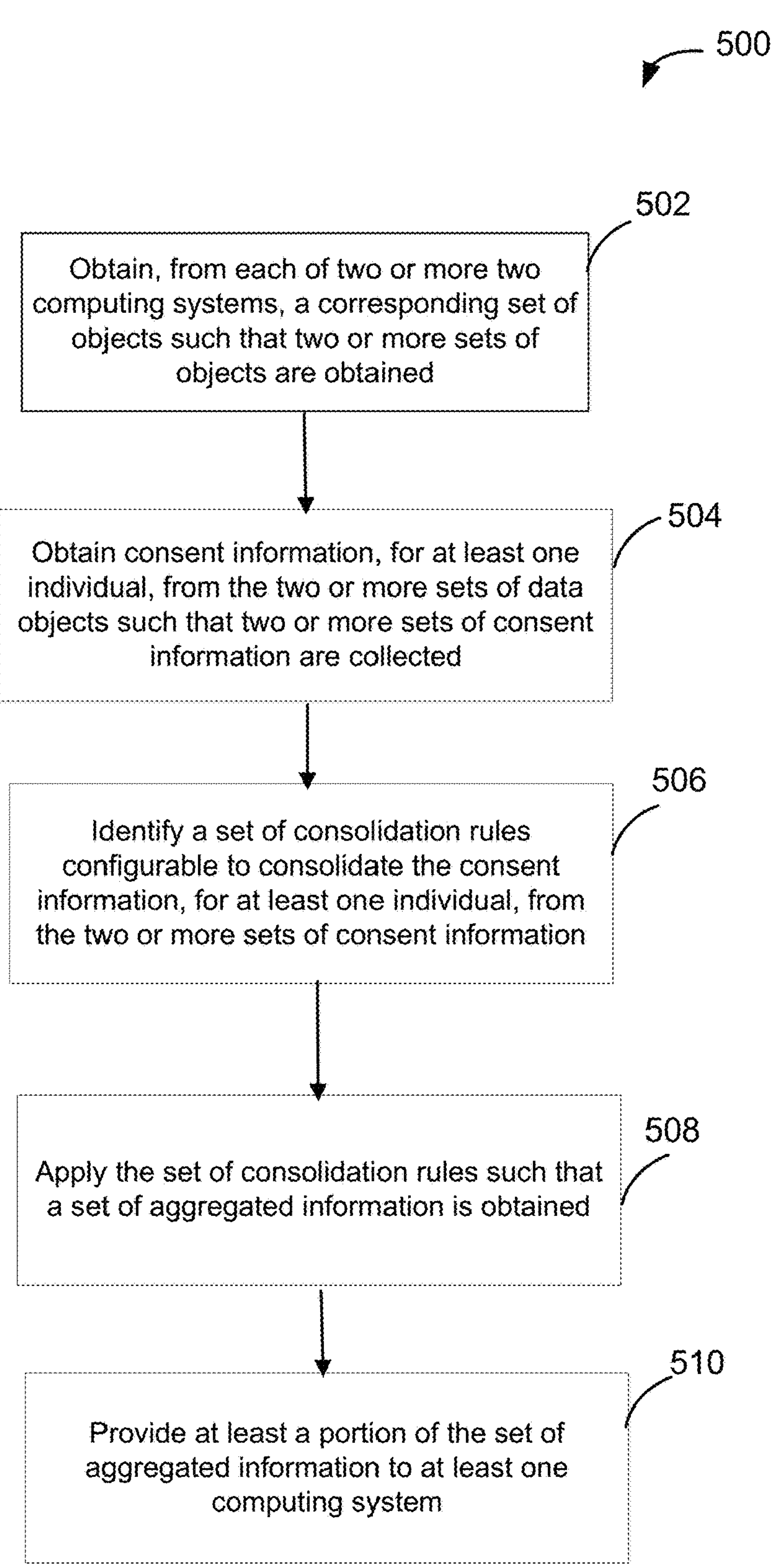
FIG. 5 shows a process flow diagram 500 illustrating a method of consolidating consent information, in accordance with some implementations.

FIG. 5 shows a process flow diagram 500 illustrating a method of consolidating consent information, in accordance with some implementations. A data consolidation system obtains, from each of two or more organizational computing systems, a corresponding set of data objects such that two or more sets of objects are obtained at 502. Each data object is associated with a corresponding individual and includes consent information indicating whether the individual consents to a particular action in relation to corresponding contact information of the individual.

In some implementations, the data consolidation system identifies the sets of objects having consent information. For example, the system may identify specific types of objects. In other implementations, organizational computing systems may identify types of objects having consent information for transmission to the data consolidation system.

The sets of objects may be transmitted by the organizational computing systems automatically or in response to a message received from the data consolidation system. Communication between the data consolidation system and organizational computing systems may be achieved via one or more APIs.

In some implementations, the data consolidation system accesses the sets of objects directly from one or more databases. For example, the data consolidation system can access consent information associated with tenants of a multi-tenant database system using tenant identifiers associated with the pertinent tenants.

The data consolidation system may obtain the consent information at 504 from the objects, for at least one individual, from the two or more sets of data objects such that two or more sets of consent information are collected. The sets of consent information include a first set of consent information corresponding to a first organizational computing system associated with a first organization and a second set of consent information corresponding to a second organizational computing system associated with a second organization.

In some implementations, the sets of consent information are stored in data storage such as a data lake or data warehouse. More particularly, the sets of consent information may be translated into a common format for storage. The sets of consent information may be stored in a flat or hierarchical architecture, which can include one or more database tables. In addition, the sets of consent information can be stored in the data storage such that each set of consent information is stored in association with a corresponding tenant identifier associated with a tenant of a multi-tenant database system.

In some implementations, the process of obtaining the consent information includes applying translation metadata indicating a mapping between a first format including one or more fields of a tenant data model to a second format including one or more fields of a common data model. More particularly, the data consolidation system can apply the translation metadata to translate consent information received in the first format to the second format and store the sets of consent information in the second format.

The data consolidation system can identify a set of consolidation rules at 506, where the set of consolidation rules is configurable to consolidate the consent information, for at least one individual, across two or more organizational computing systems. Specifically, the set of consolidation rules govern the manner in which conflicting consent information is resolved and consolidated. The set of consolidation rules may be statically configured or dynamically configured. In some instances, the set of consolidation rules is selected responsive to input received from a client device. The set of consolidation rules can also be identified based, at least in part, on a country, state, or city in which the user resides. Similarly, the set of consolidation rules can be identified based, at least in part, on a country or state in which the organizational computing systems are located.

For example, laws relating to consumer consent vary from country to country, and often vary from state to state. More particularly, some jurisdictions are "opt in" jurisdictions in which an individual needs to explicitly opt in to consent to being contacted by a business. Conversely, "opt out" jurisdictions require a user to opt out to prevent a business from contacting them.

In accordance with various implementations, a rules engine may apply an algorithm that determines the appropriate opt-in rules to apply based upon the residence address of the user for whom data has been collected. Thus, the application of a set of consolidation rules may vary based upon value(s) of field(s) of user profiles of individuals for whom consent information is being consolidated.

The set of consolidation rules can reflect business policies of the respective organizations. More particularly, the set of consolidation rules can indicate a priority of first consent information of the first set of consent information in relation to second consent information of the second set of consent information. For example, a consolidation rule can indicate that, in the event of an inconsistency or conflict, that first consent information (e.g., a first field) of a first organization (e.g., a parent organization) is to be prioritized over second consent information (e.g., a second field) of a second organization (e.g., a subsidiary). As another example, the set of consolidation rules can indicate a hierarchy among the organizations or direction in which consent information is to be propagated in the event of a conflict.

In some implementations, the set of consolidation rules implements a set of federal and/or regional laws or ordinances. For example, such consolidation rules can implement privacy laws that are applicable to the country, state, or city in which each organization operates or is incorporated. In some instances, the set of consolidation rules may indicate a time period during which consent information is valid. By implementing the set of consolidation rules independent from the manner in which the consent data is stored, set of consolidation rules can be updated over time with minimal effort and without impacting the truthfulness and accuracy of the consent information provided to organizational computing systems.

The set of consolidation rules can include one or more rules, where each rule includes two or more operands and one or more operators. An operand can include a value obtained from a field of an object or, alternatively, can be generated using one values obtained from field(s) of object(s). In some implementations, the set of consolidation rules can include a tree or other hierarchical structure.

The data consolidation system applies the set of consolidation rules to the two or more sets of consent information such that a set of aggregated consent information is obtained at 508. Application of the set of consolidation rules may be performed according to the user profile. For example, application of the set of consolidation rules may depend, in part, on a country, state, or city in which the user resides.

In some implementations, the set of consolidation rules is applied by processing all data in the data lake or data warehouse. The set of consolidation rules may be applied via one or more servers. For example, the set of consolidation rules may be applied multiple servers operating in parallel. In some implementations, the sets of consent information are stored and processed in bulk using Hadoop via a MapReduce process.

For example, first consent information and second consent information may be extracted from the data storage, where the first consent information is extracted from the first set of consent information (e.g., associated with the first organization and corresponding tenant identifier) and the second consent information is extracted from the second set of consent information (e.g., associated with the second organization and corresponding tenant identifier). Application of the set of consolidation rules can include application, by a first server, of at least one consolidation rule to the first consent information and application, by a second server, of at least one consolidation rule to the second consent information, where the servers operate in parallel. By processing consent data in bulk by multiple servers in parallel, accurate and truthful consent information can be obtained in an efficient manner.

The data consolidation system can provide at least a portion of the set of aggregated consent information to at least one organizational computing system at 510. More particularly, the system may filter the set of aggregated consent information and provide the resulting filtered consent information back to the first computing system. For example, the filtered consent information may be stored in field(s) of one or more database records of the first organization. In other words, the portion of the aggregated consent information can be stored by the data consolidation system or organizational computing system such that it replaces the consent information previously stored in field(s) of one or more database records associated with the organizational computing system (e.g., tenant identifier). The filtered consent information can be transmitted via one or more messages to the first computing system and/or stored in a temporary buffer for retrieval by the first computing system. In some implementations, the data consolidation system translates the portion of the set of aggregated consent information from the second format (e.g., CIM) to the first format prior to providing it to the first computing system.

In some implementations, aggregated consent information can be stored in the data storage, enabling a virtual representation of transformed consent information to be maintained. In other implementations, the data storage stores raw data without storing aggregated consent information.

Application of the set of consolidation rules and/or providing the portion of the set of aggregated consent information may be performed automatically, in response to a message or query received from the first computing system, or in response to a command received via a graphical user interface (GUI).

Consent information can be obtained and processed using a set of consolidation rules offline via a backend process. Alternatively, consent information can be obtained and processed in real-time. For example, consent information can be obtained and/or processed responsive to a query received from an organizational computing system.

The organizational computing system can apply the truthful consent information it has received in the portion of the set of aggregated consent information to improve a variety of system processes. Such system processes can include determining whether an individual has consented to a particular action (e.g., in relation to consent information of the individual) using the newly received consent information. In some implementations, the first computing system presents this updated truthful consent information or a portion thereof via a GUI to an employee. As a result, the employee can make improved business decisions on behalf of the individual. Similarly, the first computing system can present this truthful consent information or a portion thereof via a GUI to the individual, enabling the individual to view or update their most current aggregated consent preferences.

By providing accurate and truthful consent information to organizations, the experience of individuals who receive products or services from these organizations can be significantly improved. Furthermore, complex laws, regulations, and organizational policies may be applied in an efficient manner to ensure that organizations comply with local, federal, and organizational requirements. Therefore, the disclosed implementations provide an efficient manner of processing vast amounts of consent information while ensuring truthful consent information can be provided to multiple organizations.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
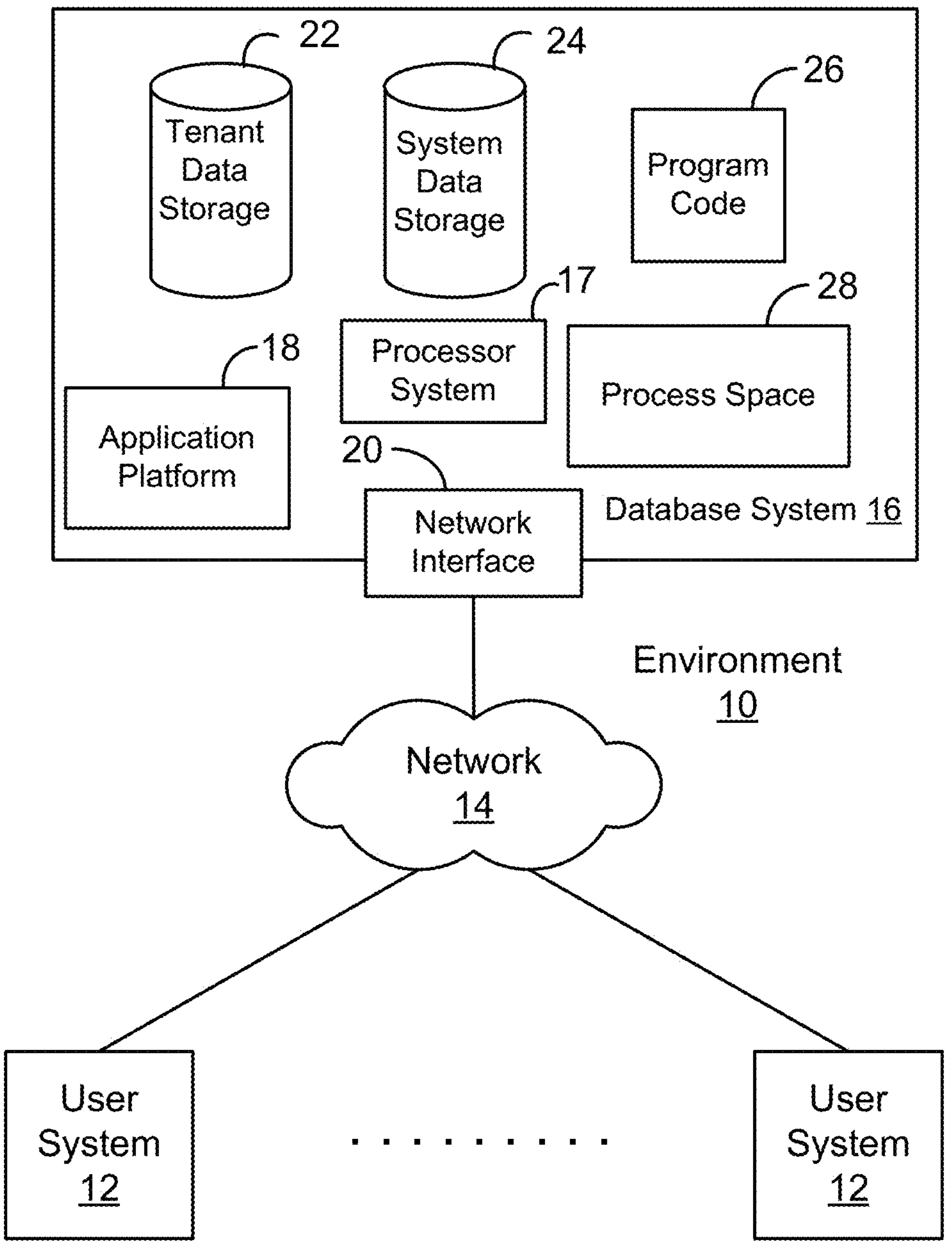
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figures 7A, 7B:
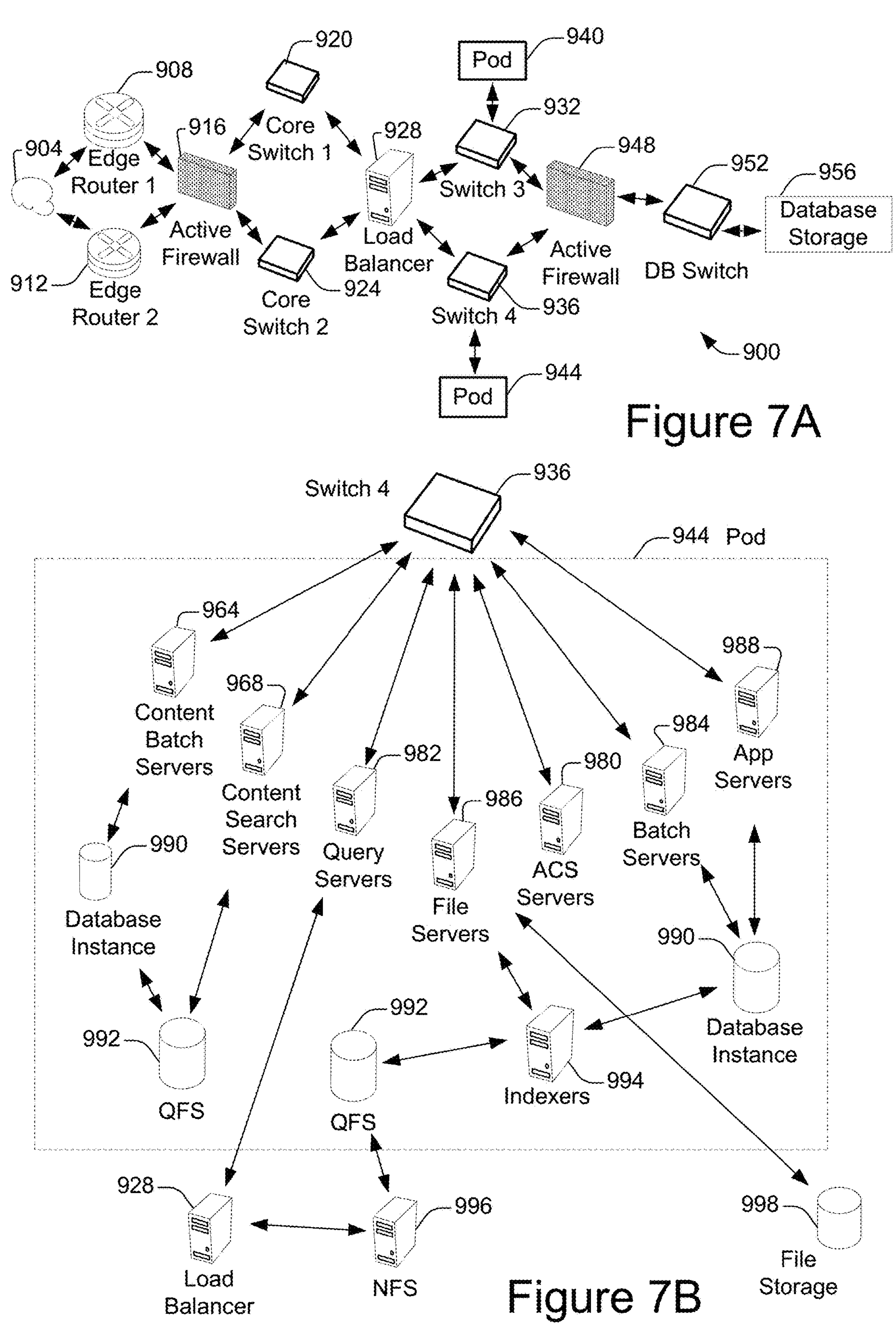
FIG. 7A shows a system diagram of an example of architectural components of an on-demand database service environment 900, in accordance with some implementations.
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
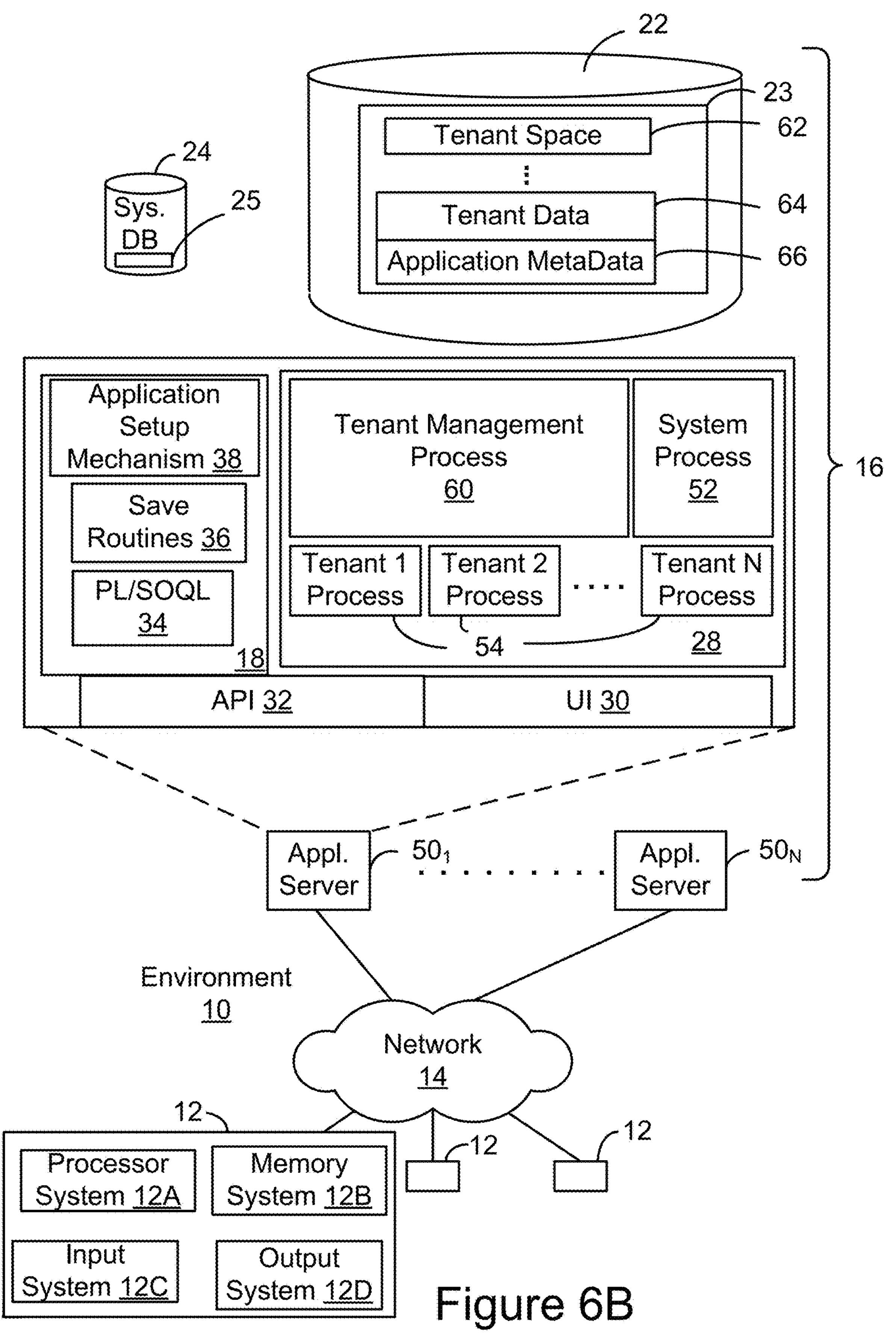
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $\mathbf{50}_1$-$\mathbf{50}_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $\mathbf{50}_1$ might be coupled via the network 14 (e.g., the Internet), another application server $\mathbf{50}_{N-1}$ might be coupled via a direct network link, and another application server $\mathbf{50}_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5

Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, California. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $\mathbf{50}_1$-$\mathbf{50}_N$ of FIG. 7B can be configured to initiate performance of one or more of the operations described above by instructing another computing device to perform an operation. In some implementations, one or more application servers $\mathbf{50}_1$-$\mathbf{50}_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method, comprising:

obtaining, by a data consolidation system, from each of two or more computing systems, a corresponding set of data objects such that two or more sets of data objects are obtained, the two or more sets of data objects being associated with a corresponding individual of a plurality of individuals, a first data object of the two or more sets of data objects including a first set of consent information indicating, for a first computing system of the two or more computing systems, whether the individual consents to an action in relation to corresponding contact information of the individual, and a second data object of the two or more sets of data objects including a second set of consent information indicating, for a second computing system of the two or more computing systems, whether the individual consents to the action in relation to the corresponding contact information of the individual, the first computing system corresponding to a first tenant of a multi-tenant database system and the second computing system corresponding to a second tenant of the multi-tenant database system;

obtaining, by the data consolidation system, consent information, for the individual, from the two or more sets of data objects, such that two or more sets of consent information including the first set of consent information and the second set of consent information are collected;

storing, by the data consolidation system at least a portion of the two or more sets of consent information in data storage in a common format defined by a common information model (CIM) using translation metadata indicating a mapping between fields of the two or more sets of data objects and the common format such that the first set of consent information is stored in association with a first tenant identifier corresponding to the first tenant and the second set of consent information is stored in association with a second tenant identifier corresponding to the second tenant, the data storage including a data lake or data warehouse;

extracting the first set of consent information from the data storage;

extracting the second set of consent information from the data storage;

identifying, by the data consolidation system, a set of consolidation rules configurable to consolidate the consent information for the individual across the two or more computing systems, the set of consolidation rules governing a manner in which conflicting consent information is resolved and consolidated, the set of consolidation rules including at least a first consolidation rule indicating a priority of at least a subset of the first set of consent information in relation to at least a subset of the second set of consent information, the subset of the first set of consent information including a first value originating or derived from a field of a first database object corresponding to the first tenant identifier, the subset of the second set of consent information including a second value originating or derived from a field of a second database object corresponding to the second tenant identifier;

applying, by the data consolidation system, the set of consolidation rules to the two or more sets of consent information such that a set of aggregated consent information is obtained, wherein applying the set of consolidation rules includes:

applying, by a first server, at least one consolidation rule of the set of consolidation rules to the first set of consent information; and applying, by a second server, at least one consolidation rule of the set of consolidation rules to the second set of consent information, wherein applying the at least one consolidation rule to the first set of consent information and applying the at least one consolidation rule to the second set of consent information are performed in parallel; and providing, by the data consolidation system, at least a portion of the set of aggregated consent information to at least the first computing system, the portion of the set of aggregated consent information indicating, according to the set of consolidation rules, for the two or more sets of data objects, whether the individual consents to the action in relation to the corresponding contact information of the individual.

2. The method of claim 1, wherein:

translating, by the data consolidation system, the portion of the two or more sets of consent information from a tenant model format to the common format using the translation metadata, the translation metadata indicating a mapping between the tenant model format and the common format, wherein the tenant model format includes one or more fields of a tenant data model and the common format includes one or more fields of the CIM; and storing the portion of the two or more sets of consent information in the common format.

3. The method of claim 1, further comprising:

translating at least a portion of the set of aggregated consent information from the common format to the tenant model format using the translation metadata, the translation metadata indicating a mapping between the tenant model format and the common format, the tenant model format including one or more fields of a tenant data model and the common format including one or more fields of the CIM;

wherein providing the portion of the set of aggregated consent information comprises providing the portion of the set of aggregated consent information in the tenant model format.

4. The method of claim 1, wherein the first consolidation rule indicates a priority of a first field of the first set of consent information in relation to a second field of the second set of consent information.

5. The method of claim 1, the set of consolidation rules indicating a hierarchy among tenants including the tenant and the second tenant.

6. The method of claim 1, the set of consolidation rules indicating a direction in which consent information is to be propagated among tenants including the tenant and the second tenant.

7. The method of claim 1, wherein applying the set of consolidation rules is performed according to a user profile of the individual, the user profile storing a residence address of the individual, the residence address including a country or state in which the individual resides.

8. The method of claim 1, wherein each of the two or more sets of data objects includes data objects storing information associated with entities including one or more of: a customer, a lead, a contact, or a person.

9. The method of claim 1, the set of consolidation rules comprising a tree or an other hierarchical structure.

10. The method of claim 1, wherein a trust relationship is established between the data consolidation system and the two or more computing systems, the trust relationship indicating, for a corresponding tenant, whether the corresponding tenant has access to specific data or services offered by the data consolidation system;

wherein providing at least the portion of the set of aggregated consent information comprises: filtering the set of aggregated consent information according to the trust relationship.

11. The method of claim 1, wherein obtaining, by the data consolidation system, from each of the two or more computing systems, a corresponding set of data objects is performed automatically periodically, responsive to an event detected by the data consolidation system, or responsive to a command received by the data consolidation system.

12. The method of claim 1, wherein providing, by the data consolidation system, at least the portion of the set of aggregated consent information to at least the first computing system comprises:

storing at least portion of the set of aggregated consent information in storage accessible by the first computing system.

13. The method of claim 1, wherein providing is performed responsive to a query received, via an application programming interface (API) of the data consolidation system, from the first computing system.

14. The method of claim 1, wherein obtaining, by the data consolidation system, from each of two or more computing systems, a corresponding set of data objects comprises: obtaining the first data object from the first computing system via an application programming interface (API) of the data consolidation system.

15. The method of claim 1, the first database object and second database object being stored in the common format in the data storage, the set of consolidation rules being implemented independent from one or more formats in which the consent information is stored by the two or more computing systems.

16. The method of claim 1, wherein: the first set of consent information is extracted from the data storage by the first server; and the second set of consent information extracted from the data storage by the second server.

17. A system including a processor and memory, the system comprising:

a database system implemented using a server system, the database system configurable to cause:

obtaining, by a data consolidation system, from each of two or more computing systems, a corresponding set of data objects such that two or more sets of data objects are obtained, the two or more sets of data objects being associated with a corresponding individual of a plurality of individuals, a first data object of the two or more sets of data objects including a first set of consent information indicating, for a first computing system of the two or more computing systems, whether the individual consents to an action in relation to corresponding contact information of the individual, and a second data object of the two or more sets of data objects including a second set of consent information indicating, for a second computing system of the two or more computing systems, whether the individual consents to the action in relation to the corresponding contact information of the individual, the first computing system corresponding to a first tenant of a multi-tenant database system and the second computing system corresponding to a second tenant of the multi-tenant database system;

obtaining, by the data consolidation system, consent information, for the individual, from the two or more sets of data objects, such that two or more sets of consent information including the first set of consent information and the second set of consent information are collected;

storing, by the data consolidation system, at least a portion of the two or more sets of consent information in data storage in a common format defined by a common information model (CIM) using translation metadata indicating a mapping between fields of the two or more sets of data objects and the common format such that the first set of consent information is stored in association with a first tenant identifier corresponding to the first tenant and the second set of consent information is stored in association with a second tenant identifier corresponding to the second tenant, the data storage including a data lake or data warehouse;

extracting the first set of consent information from the data storage;

extracting the second set of consent information from the data storage;

identifying, by the data consolidation system, a set of consolidation rules configurable to consolidate the consent information for the individual across the two or more computing systems, the set of consolidation rules governing a manner in which conflicting consent information is resolved and consolidated, the set of consolidation rules including at least a first consolidation rule indicating a priority of at least a subset of the first set of consent information in relation to at least a subset of the second set of consent information, the subset of the first set of consent information including a first value originating or derived from a field of a first database object corresponding to the first tenant identifier, the subset of the second set of consent information including a second value originating or derived from a field of a second database object corresponding to the second tenant identifier;

applying, by the data consolidation system, the set of consolidation rules to the two or more sets of consent information such that a set of aggregated consent information is obtained, wherein applying the set of consolidation rules includes:

applying, by a first server, at least one consolidation rule of the set of consolidation rules to the first set of consent information; and applying, by a second server, at least one consolidation rule of the set of consolidation rules to the second set of consent information, and wherein applying the at least one consolidation rule to the first set of consent information and applying the at least one consolidation rule to the second set of consent information are performed in parallel; and providing, by the data consolidation system, at least a portion of the set of aggregated consent information to at least the first computing system, the portion of the set of aggregated consent information indicating, according to the set of consolidation rules, for the two or more sets of data objects, whether the individual consents to the action in relation to the corresponding contact information of the individual.

18. The system of claim 17, the database system further configurable to cause:

translating the portion of the two or more sets of consent information from a tenant model format to the common format using the translation metadata, the translation metadata indicating a mapping between the first format and the common format, the tenant model format including one or more fields of a tenant data model and the common format including one or more fields of the CIM; and storing the portion of the two or more sets of consent information in the common format.

19. The system of claim 17, the database system further configurable to cause:

translating at least a portion of the set of aggregated consent information from the common format to the tenant model format using the translation metadata, the translation metadata indicating a mapping between the tenant model format and the common format, the tenant model format including one or more fields of a tenant data model and the common format including one or more fields of the CIM;

wherein providing the portion of the set of aggregated consent information comprises providing the portion of the set of aggregated consent information in the tenant model format.

20. The system of claim 17, wherein the first consolidation rule indicates a priority of a first field of the first set of consent information in relation to a second field of the second set of consent information.

21. A non-transitory computer-readable medium comprising computer-readable code, the computer-readable code configurable to cause:

obtaining, by a data consolidation system, from each of two or more computing systems, a corresponding set of data objects such that two or more sets of data objects are obtained, the two or more sets of data objects being associated with a corresponding individual of a plurality of individuals, a first data object of the two or more sets of data objects including a first set of consent information indicating, for a first computing system of the two or more computing systems, whether the individual consents to an action in relation to corresponding contact information of the individual, and a second data object of the two or more sets of data objects including a second set of consent information indicating, for a second computing system of the two or more computing systems, whether the individual consents to the action in relation to the corresponding contact information of the individual, the first computing system corresponding to a first tenant of a multi-tenant database system and the second computing system corresponding to a second tenant of the multi-tenant database system;

obtaining, by the data consolidation system, consent information, for the individual, from the two or more sets of data objects, such that two or more sets of consent information including the first set of consent information and the second set of consent information are collected;

storing, by the data consolidation system, at least a portion of the two or more sets of consent information in data storage in a common format defined by a common information model (CIM) using translation metadata indicating a mapping between fields of the two or more sets of data objects and the common format such that the first set of consent information is stored in association with a first tenant identifier corresponding to the first tenant and the second set of consent information is stored in association with a second tenant identifier corresponding to the second tenant, the data storage including a data lake or data warehouse;

extracting the first set of consent information from the data storage;

extracting the second set of consent information from the data storage;

identifying, by the data consolidation system, a set of consolidation rules configurable to consolidate the consent information for the individual across the two or more computing systems, the set of consolidation rules governing a manner in which conflicting consent information is resolved and consolidated, the set of consolidation rules including at least a first consolidation rule indicating a priority of at least a subset of the first set of consent information in relation to at least a subset of the second set of consent information, the subset of the first set of consent information including a first value originating or derived from a field of a first database object corresponding to the first tenant identifier, the subset of the second set of consent information including a second value originating or derived from a field of a second database object corresponding to the second tenant identifier;

applying, by the data consolidation system, the set of consolidation rules to the two or more sets of consent information such that a set of aggregated consent information is obtained, wherein applying the set of consolidation rules includes:

applying, by a first server, at least one consolidation rule of the set of consolidation rules to the first set of consent information; and applying, by a second server, at least one consolidation rule of the set of consolidation rules to the second set of consent information, and wherein applying the at least one consolidation rule to the first set of consent information and applying the at least one consolidation rule to the second set of consent information are performed in parallel; and providing, by the data consolidation system, at least a portion of the set of aggregated consent information to at least the first computing system, the portion of the set of aggregated consent information indicating, according to the set of consolidation rules, for the two or more sets of data objects, whether the individual consents to the action in relation to the corresponding contact information of the individual.

22. The non-transitory computer-readable medium of claim 21, the computer-readable code comprising computer-readable instructions further configurable to cause:

translating the portion of the two or more sets of consent information from a tenant model format to the common format using the translation metadata, the translation metadata indicating a mapping between the first format and the second format, wherein the tenant model format includes one or more fields of a tenant data model and the common format includes one or more fields of the CIM; and storing the portion of the two or more sets of consent information in the common format.

23. The non-transitory computer-readable medium of claim 21, the computer-readable code comprising computer-readable instructions further configurable to cause:

translating at least a portion of the set of aggregated consent information from the common format to the tenant model format using the translation metadata, the translation metadata indicating a mapping between the tenant model format and the common format, the tenant model format including one or more fields of a tenant data model and the common format including one or more fields of a common data model;

wherein providing the portion of the set of aggregated consent information comprises providing the portion of the set of aggregated consent information in the tenant model format.

* * * * *